July 7, 1953 A. L. KOUP ET AL 2,644,535
FLUID COUPLING CLUTCH

Filed June 29, 1949 2 Sheets-Sheet 1

ALFRED L. KOUP
ARTHUR A. WAGNER
INVENTOR

BY M. B. Tasker
ATTORNEY

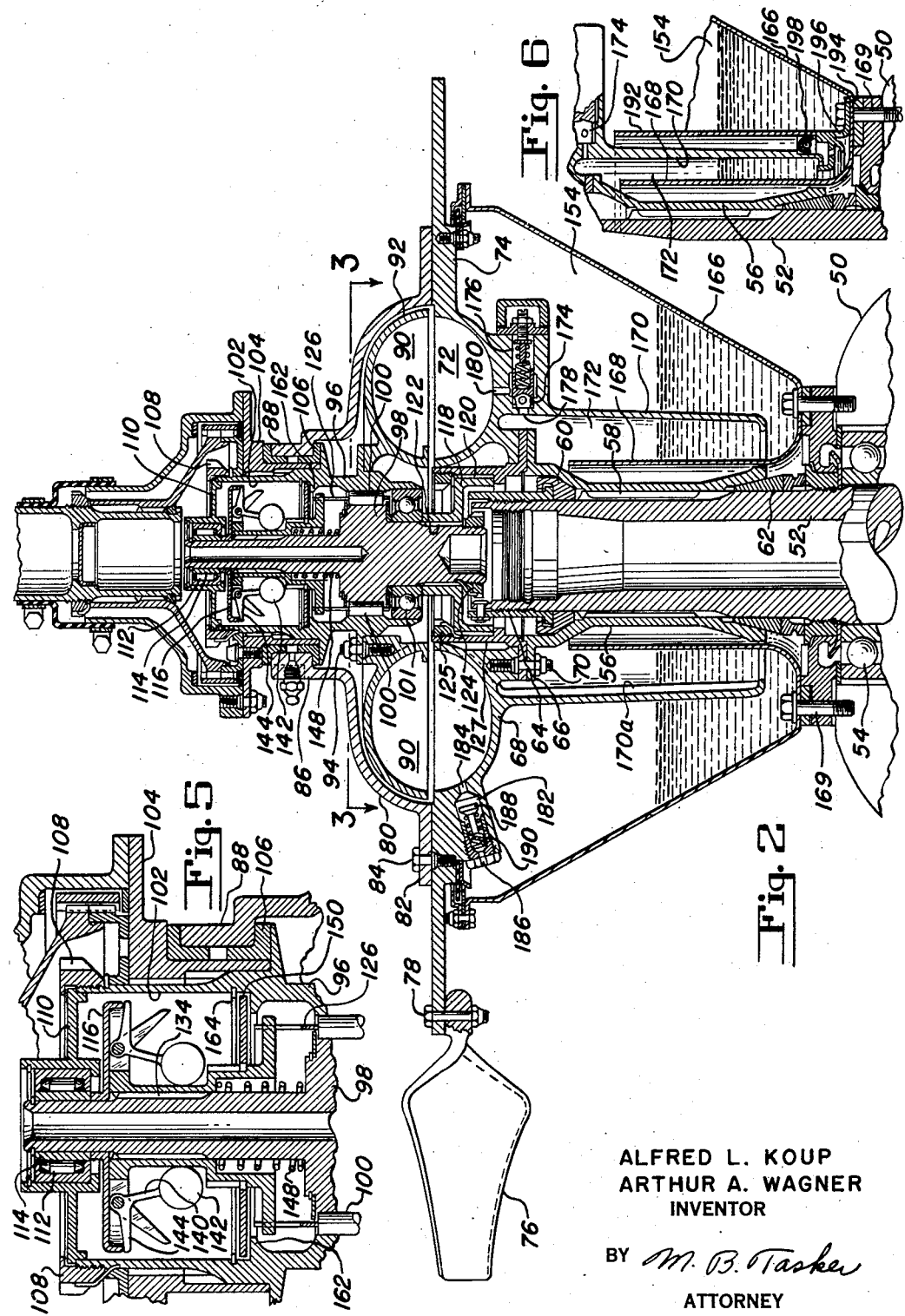

Patented July 7, 1953

2,644,535

UNITED STATES PATENT OFFICE 2,644,535

FLUID COUPLING CLUTCH

Alfred L. Koup, Stratford, and Arthur A. Wagner, Fairfield, Conn., assignors to United Aircraft Corporation, East Hartford, Conn., a corporation of Delaware Application June 29, 1949, Serial No. 102,086

16 Claims. (Cl. 170—135.75)

This invention relates to direct lift aircraft and particularly to improved clutch mechanism between the engine and the engine driven rotors.

In all direct lift aircraft which have heretofore been constructed, the starting of the rotors has been a major problem. At low R. P. M., or when at rest, the rotor blades of such an aircraft do not have sufficiently high centrifugal forces acting thereon to protect them from injury. Consequently any sudden application of torque creates an excessive deflection of the blades in their plane of rotation which results either in buckling of the trailing edges or failure of the leading edges of the blades. This type of blade failure is common with all known disc clutches if they are too rapidly engaged or with centrifugal clutches in the event that the engine accidentally overspeeds on starting, due for instance to an improper throttle or mixture setting.

It is an object of the present invention to completely overcome this problem by the provision of an improved rotor drive mechanism which limits the amount of torque which can be applied to the rotor below a given rotor R. P. M. regardless of the engine R. P. M. and the torque developed by the engine.

A further object of the invention is the provision of a clutch mechanism which incorporates all the long life, good wearing, and smooth starting features of a fluid coupling for starting the rotor while providing a positive drive above a predetermined rotor R. P. M.

Another object of the invention is to provide an improved clutch mechanism for rotor drives which is lighter in weight than existing mechanical or centrifugal clutches of equivalent horsepower capacity.

Another object of the invention is to provide a combined hydro-mechanical clutch mechanism utilizing a fluid coupling for initially accelerating the rotor which is capable of transmitting no more than a fraction of the total engine power, in combination with a positive drive mechanism for transmitting the total engine power output which is engageable only after the coupling has brought the rotor up to a predetermined R. P. M.

Other objects of the invention are to provide an improved hydro-mechanical clutch mechanism including a fluid coupling for accelerating the rotor and a positive coupling for driving the rotor in which it is possible to start the engine and idle the same without engaging the rotor or overheating the coupling; the rotor can be accelerated smoothly and without danger of injury to the blades by advancing the engine throttle until the rotor has reached a predetermined desired speed at which it is desired to engage the positive coupling; it is possible to decouple and stop the rotor while the engine remains running; and freewheeling of the rotor is permitted in autorotation.

Other objects and advantages of the invention will be evident from the drawings or will be pointed out in the following description of a preferred embodiment of the invention shown in the accompanying drawings in which:

Fig. 2 is a sectional elevation through the hydro-mechanical clutch mechanism;

Fig. 5 is an enlarged sectional detail of a part of Fig. 2 showing the governor mechanism; and Fig. 6 is a detail view of a modification of the sump for supplying fluid to the coupling.

In accordance with the above objects of the invention we provide a positive freewheeling type coupling between the engine and the rotors which is capable of transmitting the entire torque of the engine to the rotor. Governor mechanism is provided which permits the engagement of this positive coupling only after the rotor has been accelerated to a predetermined R. P. M. at which sufficiently high centrifugal forces are present in the blades to prevent excessive deflection of the blades in their plane of rotation upon the sudden application of full engine torque. This initial acceleration is accomplished by a fluid coupling which is connected in parallel with the positive drive coupling. The fluid coupling, which is designed to transmit only a small fraction of the engine torque, can be light in weight. The fluid coupling is automatically filled at a predetermined engine R. P. M. and is likewise emptied automatically when the engine speed falls slightly below this predetermined value. In this way the rotor blades are protected since the amount of torque which can be applied to the rotor below a given rotor R. P. M. is limited. Any excess power developed by the engine prior to engagement of the positive coupling will be dissipated through slippage of the fluid coupling.

Figure 1:
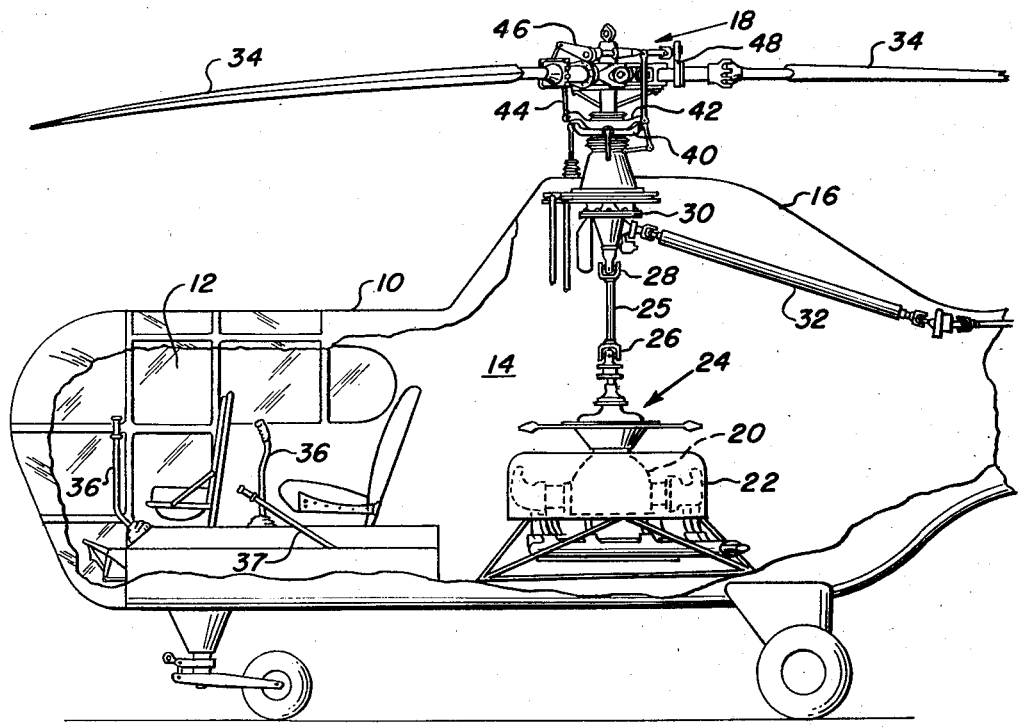
Fig. 1 is a partial side elevation of a helicopter with parts broken away to facilitate illustration.

As shown in Fig. 1, the helicopter chosen to illustrate the invention includes a fuselage 10 having a pilot's compartment 12 in the forward portion and an engine compartment 14 amidship thereof beneath the usual pylon 16 which supports the main rotor 18. The engine 20 is enclosed in a cowling 22 and has mounted directly thereon a hydro-mechanical clutch mechanism 24 with which this invention is particularly concerned. The power from the clutch mechanism 24 is transmitted through a shaft 25 and universal joints 26 and 28 to the usual reduction gear box 30 where a usual drive 32 is taken off for the tail rotor (not shown).

The main rotor 18 includes the usual blades 34 having articulated connections to the rotor head for permitting movement both in a vertical flapping direction and in the plane of rotation of the blades about the usual drag hinges. The blades are also mounted for movement about their longitudinal axes in the usual manner to effect changes in blade pitch.

The pitch of the blades 34 is controlled from the pilot's compartment by the usual cyclic pitch control stick 36 and total pitch control lever 37 through suitable connections to the usual stationary and rotatable swash plate members 40 and 42. Movement of the rotatable plate 42 either vertically to change the pitch of the blades collectively or in azimuth to change the pitch of the blades cyclically is conveyed through suitable linkage including the rods 44 and bell cranks 46 to usual blade horns 48.

Referring to Fig. 2, 50 indicates the engine crankcase and 52 the hollow vertical crankshaft of the engine which is journalled in anti-friction bearings in the crankcase, the uppermost of which bearings shows at 54. The projecting end of crankshaft 52 carries a sleeve 56 which is splined to the crankshaft at 58 and is supported thereon by upper and lower wedges 60 and 62 and the usual clamping nut 64 bearing against wedge 60. Sleeve 56 has an upper flanged end 66 to which the driving member 68 of a fluid clutch, or coupling, is connected by a series of studs 70. The coupling is small and light in weight, being designed to transmit only a small fraction of the torque which the engine 20 is capable of developing. Clutch member 68 includes the lower portion of the clutch housing, impeller vanes 72 and an outstanding flange 74 to the periphery of which a plurality of cooling fan blades 76 are connected each by a pair of bolts 78. The upper portion of the housing for the clutch comprises a shell 80 having a horizontal flange 82 connected by bolts 84 to flange 74 and a vertical flange 86 which has an annular bearing portion 88 on the driven clutch member.

The driven clutch member includes complemental vanes 90 carried by a runner 92 which is connected by studs 94 to a driven member 96 of a positive mechanical coupling comprising driving member 98 and intermediate clutch rollers 100. The driven member 96 is journalled at its lower end in a bearing 101 carried by driving member 98 and has an upstanding sleeve 102 to which is splined a member 104 which, with the member 96, carries a bearing sleeve 106 which supports the bearing ring 88 of the upper portion of fluid clutch housing 80. Member 104 is clamped on sleeve 102 by a nut 108 which also clamps an upper bearing supporting plate member 110 to sleeve 102 and forms a support for the upper journal 112 for the driving member 98 of the positive clutch. The inner race 114 of this bearing also clamps a depending cup-shaped washer 116 which abuts the flyweight mechanism of the governor hereinafter to be described.

The driving member 98 of the positive clutch mechanism is supported on and is driven directly from the driving member 68 of the fluid coupling by means of a flanged member 118 having an external splined connection 120 with a sleeve member 127 and an internal splined connection 122 with driving member 98, the member 118 being held in place by a suitable nut 124 threaded onto the lower end of member 98 and an opposed nut 125 having a threaded connection with sleeve member 127 which latter member has a flange clamped between flange 66 of sleeve 56 and driving member 68 of the fluid coupling.

Figure 4:
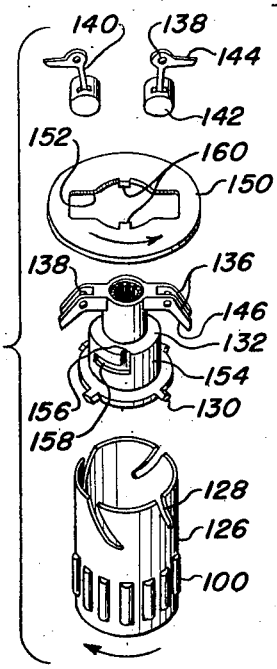
Fig. 4 is an exploded view of the governor mechanism for controlling the engagement and disengagement of the positive coupling.

Rollers 100 of the positive drive coupling are controlled by a centrifugal governor to effect engagement and disengagement of the positive coupling in response to changes in engine speed. As shown most clearly in Figs. 2 and 4, rollers 100 are mounted in a cylindrical cage 126 near the lower end of the latter. The upper end of cage 126 is provided with four spiral slots 128 to receive correspondingly shaped fingers 130 on a vertically slidable governor assembly. This assembly includes a generally tubular clutch actuating member 132 having the integral fingers 130 at the lower end thereof and having a straight vertically splined bore which is slidable on the upper splined end 134 of drive member 98. Member 132 carries two pairs of diametrically opposed arms 136 at its upper end, each of which supports therebetween a bell crank pivoted at 138. Each bell crank includes a depending arm 140 (see also Fig. 5) carrying a governor flyweight 142 and an integral outwardly directed arm 144, the extremity of which engages the stationary washer 116 (Figs. 2 and 5). The pairs of arms 136 on actuating member 132 are directed downwardly at an oblique angle and form outboard stops 146 for the flyweights 142. It will be evident that as the flyweights 142 move outwardly under the action of centrifugal force the point of engagement of the arms 144 with the depending peripheral flange on stationary washer 116 will form fulcrum points resulting in downward movement of member 132. This movement, however, is resisted by a compression spring 148 which abuts a shoulder on the driving member 98 at one end and extends into an axial recess in member 132 and abuts a corresponding shoulder therein so that the member 132 is constantly biased upwardly to hold the flyweights 142 against the member 132 which constitutes the inboard stop for the flyweights.

Means is provided for preventing downward vertical movement of member 132 under the action of the governor to engage the direct drive coupling except under conditions under which the mechanical coupling can safely be connected, namely when the driving member 98 is rotating at a slower speed than the driven member 96. To this end a blocker plate 150 is provided to control the vertical movement of member 132 under the action of the governor so that this member can be moved down by the governor only when the engine is rotating the driving member 98 at a sufficient R. P. M. to overcome the resistance of spring 148 and also when the driving member 98 is rotating slightly slower than the driven member 96. The blocker plate has a central aperture 152 which permits it to be passed over arms 136 and this aperture has an axial portion which fits over an enlarged cylindrical portion 154 on member 132. Portion 154 has two diametrically opposed vertical grooves 156 which communicate with horizontal, or circumferential, grooves 158 at their lower ends to form locking slots for a pair of diametrically opposed inwardly directed ears 160 on the blocker plate.

Movement of the ears 160 in the angularly related grooves 156, 158 is controlled by the relative speed of rotation of member 132 and the driven member 96. To accomplish this, member 96 has an annular internal flange 162 at the proper height to engage the bottom surface of blocker plate 150 adjacent its periphery. The blocker plate 150 is held loosely in position on flange 162 by a snap ring 164 which is seated in a groove just above plate 150 in the inner wall of sleeve 102.

Fluid for the fluid coupling is contained in a stationary annular sump 154 which comprises an outer wall 166 and a concentric inner wall 168 through which the crankshaft extends. This stationary sump is fixed to the engine crankcase by a series of bolts 169. Outer wall 166 terminates adjacent flange 74 which carries one of the complemental parts of an annular oil seal, the other of which is carried by wall 166. In place of the seal shown it may be preferable to have a conventional slinger or other type of seal. The inner wall 168 extends well above the oil level in the sump. The annular baffle 170 which is rotatable with and depends from the drive coupling member 68, carries vanes 170a to act as a centrifuge on the oil in the inner sump 172, the centrifugal action forcing the oil along the inside periphery of baffle 170 into the coupling.

The admission of fluid from the rotary sump into the fluid coupling is controlled by a spring loaded valve 174, the movable valve member of which is horizontally disposed in a chamber 176 formed in member 68. When the driving member 68 of the coupling reaches a predetermined R. P. M. valve 174 opens under the action of centrifugal force and fluid under centrifugal force is admitted from the rotating sump 172 through passage 178 into chamber 176 and through passage 180 into the coupling.

Coupling member 68 also has a chamber 182 formed therein which communicates with the interior of the coupling through a passage 184 and with the stationary sump through a passage 186. A valve member 188 is constantly biased inwardly by a spring 190 into open position and is adapted to close under the action of centrifugal force at a predetermined R. P. M. of the engine which is below the R. P. M. at which valve 174 opens. It will be evident that below the predetermined R. P. M. for which the valve member 188 is set, fluid will be discharged from the coupling through this valve into the stationary sump 154.

Fig. 6 shows a modified construction of the rotary sump for supplying fluid to the coupling in which an additional upstanding annular baffle 192 is provided external of and concentric with rotating baffle 170. Baffle 192 is held in place at the bottom of the sump by a base flange 194 through which the cap screws 169 extend, and is further formed with passages 196 providing fluid communication between the stationary and the rotary sump chambers. Additionally an annular seal 198 is provided between the lower annular extremity of rotary baffle 170 and the base of stationary baffle 192 which prevents fluid from being discharged upwardly between these baffles and also keeps the oil in the stationary sump chamber out of contact with the rotating baffle 170. This modified construction eliminates the need for an expensive seal between the top of the stationary sump member 166 and flange 74 and further eliminates undesirable "fogging" of the fluid in the sump during operation.

In the following description of the operation of the transmission, specific values have been given at which the fluid coupling is filled and emptied and at which the governor operates. A specific value has also been stated for the torque capacity of the fluid coupling. It will be understood that these are by way of illustration and can be widely varied in the practice of the invention.

Upon starting the engine, the engine is disconnected from the rotor at both the fluid coupling and the freewheeling mechanical coupling. The fluid coupling is empty because the engine speed is below 1800 R. P. M. below which speed the drain valve 188 is open and also, of course, is below 2000 R. P. M. at which inlet valve 174 is set to open and fill the coupling. The positive drive through the freewheeling coupling is also disconnected because the engine speed is below 1200 R. P. M. and the flyweights 142 are held by spring 148 against the inboard stop provided by member 132. The engine can be run indefinitely without connecting it to the rotor provided engine speed does not exceed the 2000 R. P. M. limit at which the inlet valve 174 is set to open.

In taking off the helicopter, the rotor is first brought up to a reasonable speed by means of the fluid clutch with the rotor blades at low pitch. This is accomplished by advancing the throttle until 2000 R. P. M. of the engine is exceeded whereupon valve 174 opens by centrifugal force and fluid, which may be oil, flows from the rotating sump 172 through valve 174 into the fluid coupling. Since valve 188 will have closed at 1800 R. P. M. the coupling will fill. As the fluid coupling fills, smooth engagement of the rotor with the engine is accomplished and the rotor is brought up to a reasonable speed, say 1500 R. P. M. of the driven member 96.

During this initial operation of bringing the rotor up to speed, it will be understood that engagement of the freewheeling coupling will be prevented by the blocker plate 150, although the 1200 R. P. M. setting of the governor is exceeded, since the slip of the coupling causes the speed of the driving member to exceed that of the driven member and the ears 160 on the blocker plate are consequently held in the dead ends of the circumferential slots 156. In this position of the blocker plate the actuating member 132 is prevented from moving downwardly to engage the freewheeling clutch.

Also, since the fluid coupling is capable of transmitting only about 10% of the maximum power which the engine 20 can develop, the rotor is brought smoothly and gently up to a speed where the centrifugal forces in the blades are adequate to protect the blades against damage due to the application of excessive torque. If the operator attempts to apply too much torque to the blades during this operation of accelerating the rotor, any excess power will simply be lost by slip in the fluid coupling.

Figure 3:
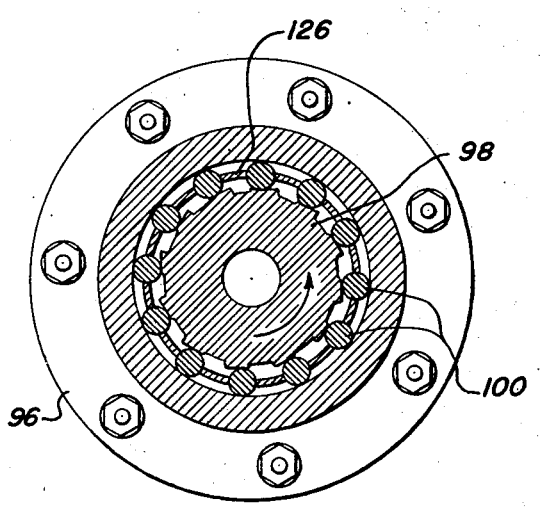
Fig. 3 is a section through the positive drive freewheeling coupling taken on line 3—3 of Fig. 2.

A positive drive connection between the engine and the rotor through the freewheeling unit is accomplished by decelerating the engine until the speed of driving member 98 is slightly less than the speed of driven member 96. The blocker plate 150 is thereupon moved in a counterclockwise direction, as indicated by the arrow in Fig. 4, relative to member 132 due to the frictional engagement of its periphery with flange 162 on the driven member 96. This results in the ears 160 moving counterclockwise along the slots 158 until they are in the vertical slot portions 156. If the engine is then rotating above 1200 R. P. M., the flyweights will immediately move outward until they engage the outboard stops 146 and will force member 132 downwardly against the bias of spring 148. Downward movement of member 132 will, through the action of prongs 130 in the spiral slots 128, cause shell 126 to be moved clockwise as indicated by the arrow in Fig. 4. As will be clear from Fig. 3, clockwise rotation of shell 126 will move the rollers 100 against the inclined cam surfaces on the driving member 98 so that upon accelerating the engine, engagement of the freewheeling unit will result and a positive drive from the engine to the rotor will be in effect. As the engine is accelerated with the freewheeling unit in positive driving position, the pitch of the blades is increased collectively by operation of lever 37 to take off during which operation full engine power can be safely transmitted to the rotor through the positive clutch. During power flight and autorotation the freewheeling unit operates in a normal manner.

If it is desired following landing to stop the rotor while the engine continues to run, the engine is throttled down below 1800 R. P. M. which is the setting of valve 188, whereupon oil is dumped from the fluid coupling to the stationary sump 154 to empty the fluid coupling. When the engine is throttled below 1150 R. P. M., the force of spring 148 exceeds the flyweight force and moves member 132 upwardly resulting in declutching of the rollers 100.

The spring 148 is designed with a spring rate that is less than the rate of the flyweights 142; that is, at a speed slightly above 1200 R. P. M. the flyweights will start to move outwardly and their increase in force with increased radius will be greater than the spring resistance with increase in deflection. The spring and flyweights are so proportioned that when the flyweights are against the outer stops 146, the spring force is sufficient to return the flyballs to their inner stops at speeds of 1150 R. P. M. or less.

It will be evident that as a result of this invention an improved clutch mechanism has been provided for accelerating a helicopter rotor smoothly in its lower speed range without danger of injury to the blades in conjunction with a positive mechanical coupling for taking the full engine power, while still retaining the vital provision of freewheeling for autorotation. It will also be noted that as a result of this construction, it is possible to start the engine and idle the same indefinitely without engaging the rotor; that it is impossible to engage the mechanical coupling other than at approximately synchronous speed of the driving and driven clutch members; and that the control of the mechanical coupling by a simple manipulation of the throttle is provided for, while decoupling and stopping of the rotor is also possible without stopping the engine.

It will further be evident that by providing a partial torque fluid coupling for accelerating the rotor, which can be correspondingly light in weight, in combination with a positive drive freewheeling type coupling for transmitting full engine torque, which is in itself inherently light in weight, it has been possible as a result of this invention to reduce materially the weight of the clutch mechanism over those previously known, while at the same time the danger of damaging the rotor blades in the process of bringing the rotor up to speed has been completely eliminated.

While one embodiment of the invention has been shown and described, it will be obvious that various modifications in the construction and arrangement of the parts may be made without departing from the scope of the invention.

We claim:

1. Power transmission mechanism for connecting the engine driven shaft and the rotor drive shaft of a direct lift aircraft comprising, a partial torque clutch connecting said shafts, said clutch having a torque transmitting capacity which is a small fraction only of the full torque which the engine can develop but which is sufficient to accelerate the rotor at low pitch to a speed at which sufficiently high centrifugal forces are developed in the rotor blades to prevent excessive deflection of the blades in their plane of rotation upon application of full engine torque, means responsive to engine R. P. M. for engaging said partial torque clutch, a second clutch connecting said shafts having a capacity to transmit the full torque which the engine can develop, and means for controlling the connection of said second clutch which is operative only after the rotor has been accelerated at partial engine torque by said first mentioned clutch to an R. P. M. at which safe centrifugal forces have developed in the rotor blades including a speed governor for effecting the connection of said second clutch and blocker mechanism responsive to the relative speeds of said drive shaft and said driven shaft for controlling the operation of said governor.

2. In a helicopter having a main sustaining rotor, an engine for turning said rotor, clutch mechanism including two clutches in parallel for connecting said engine and rotor, one of said clutches comprising a positive freewheeling type clutch capable of transmitting full engine torque from said engine to said rotor, and the other clutch comprising a small fluid coupling capable of transmitting only a small fraction of the full engine torque to said rotor, valve means responsive to engine R. P. M. for filling said fluid coupling to bring said rotor up to an R. P. M. at which it is safe to apply full engine torque to said rotor, and speed governor means responsive to engine R. P. M. controlling the connection of said positive clutch.

3. In a helicopter having a main sustaining rotor, an engine for turning said rotor, clutch mechanism including two clutches in parallel for connecting said engine and rotor, one of said clutches comprising a positive freewheeling type clutch capable of transmitting full engine torque to said rotor, the other clutch comprising a small fluid coupling capable of transmitting only a small fraction of the full engine torque, valve means responsive to engine R. P. M. for filling and emptying said fluid coupling, and governor means responsive to rotor R. P. M. controlling the connection of said positive drive clutch.

4. Power transmission mechanism for connecting the engine driven shaft and the rotor drive shaft of a helicopter comprising, driving and driven members, a fluid coupling between said members, a freewheeling coupling between said members in parallel with said fluid coupling for providing a positive drive from said driving member to said driven member, an actuating member for engaging and disengaging said freewheeling coupling, governor mechanism for moving said actuating member in a direction to engage said freewheeling coupling above a predetermined R. P. M. of said driving member, and blocker mechanism controlling the coupling engaging movement of said actuating member and responsive to a decrease in speed of said driving member relative to said driven member for releasing said actuating member for movement to engage said coupling.

5. Power transmission mechanism for connecting the engine driven shaft and the rotor drive shaft of a helicopter comprising, axially aligned driving and driven members, a fluid coupling between said members, a freewheeling coupling between said members in parallel with said fluid coupling providing a positive drive from said driving member to said driven member, an actuating member for engaging and disengaging said freewheeling coupling, governor mechanism for moving said actuating member in a direction to engage said freewheeling coupling above a predetermined R. P. M. of said driving member, a blocking member controlling the coupling engaging movement of said actuating member mounted on said driven member and fixed against axial movement relative thereto, said actuating member and blocking member having cooperating interlocking surfaces for locking said actuating member against axial movement to engage said coupling in one relative rotational position of said actuating member and said blocking member and for releasing the former for coupling engaging movement in another relative rotational position of said actuating member and blocking member.

6. Power transmission mechanism for connecting the engine driven shaft and the rotor drive shaft of a helicopter comprising, driving and driven members, a fluid coupling between said members, a freewheeling coupling between said members in parallel with said fluid coupling for providing a positive drive from said driving member to said driven member, an actuating member for engaging and disengaging said freewheeling coupling, governor mechanism operative to move said actuating member in a direction to engage said freewheeling coupling above a predetermined R. P. M. of said driving member, and mechanism for locking said actuating member against coupling engaging movement whenever said rotor is being accelerated and for unlocking said member whenever said driven member is rotating faster than said driving member, including a blocking element having frictional engagement with said driven member, and cooperating interlocking surfaces on said blocking element and said actuating member.

7. Transmission mechanism for a helicopter comprising driving and driven members, a fluid coupling having driving and driven vaned elements which are connected respectively with said driving and driven members, a freewheeling coupling between said members in parallel with said fluid coupling for providing a positive drive from said driving member to said driven member, said freewheeling coupling including opposed roller engaging surfaces, one of which surfaces comprises a cam surface, and a cage carrying roller means adapted to cooperate with said opposed surfaces, an actuating member having an operative connection with said cage for moving the latter into and out of engagement with said opposed surfaces, governor mechanism operative to move said actuating member in a direction to engage said freewheeling coupling above a predetermined R. P. M. of said driving member and locking mechanism for locking said actuating member against coupling engaging movement whenever said rotor is being accelerated and for unlocking said member whenever said driven member is rotating faster than said driving member, including a blocking element mounted on said driven member in frictional engagement therewith and fixed against axial movement thereon, said blocking element and said actuating member having cooperating interlocking tongues and slots, said slot having a circumferential portion adapted to receive said cooperating tongue and a communicating slot parallel with the axis of said actuating member into which said tongue is moved by the frictional engagement between said blocking element and said driven member.

8. Power transmission mechanism for connecting the engine driven shaft and the rotor drive shaft of a helicopter comprising, concentric driving and driven members, a hydraulic coupling having driving and driven fluid coupling elements which are connected respectively with said driving and driven members, a freewheeling coupling mechanically connecting said members in parallel with said hydraulic coupling for providing a positive drive from said driving member to said driven member, an actuating member movable to engage and disengage said freewheeling coupling, centrifugal governor mechanism for moving said actuating member in a direction to engage said freewheeling coupling at a predetermined R. P. M. of said driving member, a blocking member mounted on said driven member and fixed against axial movement relative thereto having surfaces cooperating with both said actuating member and said driven members, the surface of said blocking member which cooperates with said driven member having a frictional engagement with the latter permitting rotation of said blocking member relative thereto and the surface which cooperates with said actuating member having a limited rotational movement relative thereto, the cooperating surfaces of said blocking member and said actuating member being arranged to prevent axial movement of the latter in one relative rotational position of said blocking member and permitting axial coupling engaging movement of said actuating member in another relative rotational position, whereby said actuating member is released for axial movement to engage said freewheeling coupling whenever said driving member is both rotating slower than said driven member and is rotating above said predetermined R. P. M.

9. A hydro-mechanical transmission mechanism for connecting the engine driven shaft and the rotor drive shaft of a helicopter comprising, a fluid coupling having driving and driven fluid coupling elements carried by said driving and driven shaft respectively, stationary and rotatable fluid sumps adapted to contain hydraulic fluid for said coupling, valve means controlling the admission of fluid from said rotary sump into said coupling operable to fill said coupling at a predetermined R. P. M. of said driving member, a second valve means for discharging the fluid in said coupling into said stationary sump operable to empty said coupling at a predetermined R. P. M. of said driving member below that at which said first-mentioned valve means opens to fill said coupling, a freewheeling coupling between said driving and driven members in parallel with said fluid coupling for providing a positive drive between said members, an actuating member for engaging and disengaging said freewheeling coupling, governor mechanism for exerting a force tending to move said actuating member in a direction to engage said freewheeling coupling at a predetermined R. P. M. of said driving member, and blocking mechanism for preventing the engagement of said freewheeling coupling during acceleration of said rotor by said fluid coupling, said blocking mechanism being responsive to a reversal of torque between said driving and driven members for releasing said actuating member to engage said freewheeling coupling.

10. A hydro-mechanical transmission mechanism for connecting the engine driven shaft and the rotor drive shaft of a helicopter comprising, a fluid coupling having driving and driven fluid coupling elements carried by said driving and driven members respectively, stationary and rotatable fluid sump means adjacent said coupling, a centrifugally operated valve for admitting fluid from said rotary sump to said coupling at a predetermined R. P. M. of said driving member, means enabling the engine to be run in a certain speed range including idling without driving said driven member including a dump valve for discharging fluid from said coupling into said stationary sump at a predetermined R. P. M. of said driving member which is below the R. P. M. at which said first-mentioned valve opens to fill said coupling, a freewheeling coupling between said driving and driven members in parallel with said fluid coupling providing a positive drive between said members, an actuating member for engaging and disengaging said freewheeling coupling, governor mechanism for moving said actuating member to engage and disengage said freewheeling coupling at predetermined R. P. M. of said driving member, and mechanism responsive to a reversal of torque between said driving and driven members after the rotor has been brought up to a predetermined speed by said fluid coupling for releasing said actuating member and engaging said freewheeling coupling.

11. Transmission mechanism for connecting the engine driven shaft and the rotor driving shaft of a helicopter comprising, a fluid coupling having a driving coupling member connected with said engine driven shaft and a driven coupling member connected with said rotor driving shaft, a sump adapted to contain fluid for said coupling, means rotated by said driving coupling member for effecting rotation of a portion of the fluid in said sump, a normally closed centrifugally operated valve in communication with the rotatable portion of the fluid for controlling the admission of said fluid to said coupling and adapted to open at a predetermined R. P. M. of said driving coupling member, and a normally open centrifugally operated valve controlling the discharge of fluid from said coupling and adapted to close at a predetermined R. P. M. of said driving coupling member.

12. Transmission mechanism for connecting the engine driven shaft and the rotor driving shaft of a helicopter comprising, a fluid coupling having a driving coupling member connected with said engine driven shaft and a driven coupling member connected with said rotor driving shaft, a stationary sump surrounding said engine driven shaft and adapted to contain fluid for said coupling, means rotated by said driving coupling member and depending into the fluid in said sump for rotating a portion of the fluid therein, a normally closed centrifugally operated valve controlling the admission of fluid to said coupling adapted to open at a predetermined R. P. M. of said driving coupling member, and a normally open centrifugally operated valve controlling the discharge of fluid in said coupling adapted to close at a predetermined R. P. M. of said driving coupling member which is slightly below the R. P. M. at which said normally closed valve opens.

13. Transmission mechanism for connecting the engine driven shaft and the rotor driving shaft of a helicopter comprising, a fluid coupling having a driving member connected with said engine driven shaft and a driven member connected with said rotor driving shaft for releasably connecting said shafts, a sump adapted to contain fluid for said coupling carried by said driven shaft, a cylindrical barrier driven by the driving member of said coupling and depending below the oil level in said sump, said barrier having fluid engaging means on its inner surface for rotating the body of fluid therewithin, a normally closed centrifugally operated valve carried by the driving member of said coupling and communicating with said coupling and with the body of fluid within said barrier for admitting fluid to said coupling from said rotating fluid body at a predetermined R. P. M. of said engine driven shaft, a normally open centrifugally operated valve carried by the driving member of said coupling and communicating with said coupling and the body of fluid in said sump outside said barrier for emptying said coupling at a predetermined R. P. M. of said driving member which is below the R. P. M. at which said normally closed valve opens.

14. Transmission mechanism for connecting the engine driven shaft and the rotor driving shaft of a helicopter comprising, a fluid coupling having a driving coupling member connected with said engine driven shaft and a driven coupling member connected with said rotor, an annular sump surrounding said engine driven shaft adapted to contain fluid for said coupling, a generally cylindrical barrier rotatable with the driving member of said coupling and extended below the level of the fluid in said sump having a fluid engaging scoop member on its inner wall, a stationary barrier concentric with said scoop member surrounding the latter and dividing said sump into inner and outer chamber, sealing means between said rotary barrier and said stationary barrier, and passage means in said stationary barrier between said chambers below said seal.

15. Transmission mechanism for connecting the engine driven shaft and the rotor driving shaft of a helicopter comprising, a fluid coupling having a driving coupling member connected with said engine driven shaft and a driven coupling member connected to said rotor driving shaft, an upstanding annular sump surrounding said engine driven shaft, an annular upstanding barrier in said sump dividing the latter into inner and outer chambers, said barrier having passage means adjacent its lower end providing fluid communication between said inner and outer chambers and extending at its upper end above the level of the fluid in said sump, a concentric annular barrier member rotatable with said engine driven shaft extending below the level of the fluid in said inner sump chamber, an annular seal between said rotatable barrier member and said stationary barrier above the passages in the latter, centrifugal force operated valve means communicating with said coupling and said inner sump chamber adapted to open and admit fluid from said inner sump chamber to said coupling at a preselected R. P. M. of said engine driven shaft, and a centrifugal force operated dump valve communicating with said coupling and said outer sump chamber for emptying said coupling at a preselected R. P. M. of said engine driven shaft.

16. In a helicopter having a main sustaining rotor, an engine for turning said rotor, clutch mechanism including two clutches in parallel for connecting said engine and rotor, one of said clutches comprising a positive freewheeling clutch capable of transmitting full engine torque to said rotor, the other clutch comprising a fluid clutch capable of transmitting only a fraction of the full engine torque, means for filling and emptying said fluid coupling, and governor means responsive to rotor R. P. M. controlling the connection of said positive drive clutch.

ALFRED L. KOUP.
ARTHUR A. WAGNER.

References Cited in the file of this patent

UNITED STATES PATENTS

| Number | Name | Date |
|---|---|---|
| 2,256,960 | Neracher et al. | Sept. 23, 1941 |
| 2,351,483 | Carnagua | June 13, 1944 |
| 2,386,285 | Zeidler | Oct. 9, 1945 |
| 2,442,840 | Carnagua | June 8, 1948 |
| 2,453,791 | Harstick | Nov. 16, 1948 |
| 2,456,942 | Holbrook | Dec. 21, 1948 |
| 2,500,002 | Miller | Mar. 7, 1950 |